Dec. 18, 1962    A. MUSSCHOOT    3,068,996
REVERSIBLE VIBRATORY FEEDER
Filed June 27, 1961    2 Sheets-Sheet 1
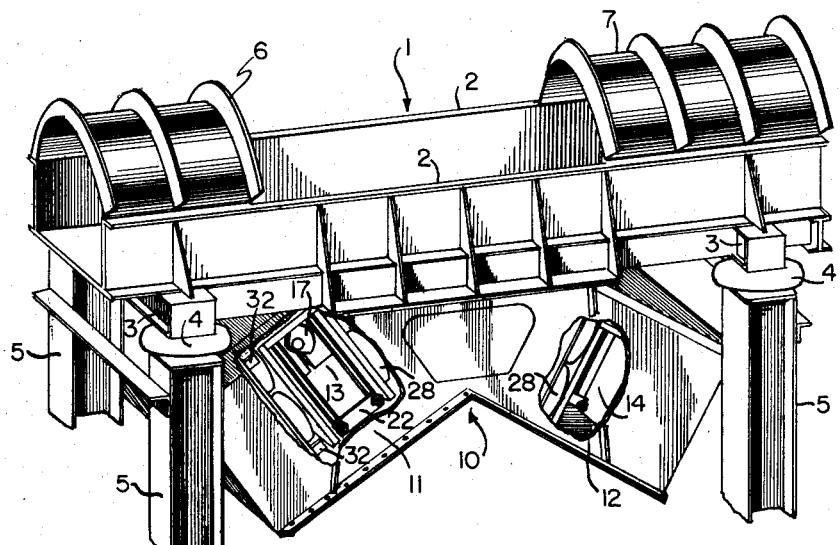
Fig. I
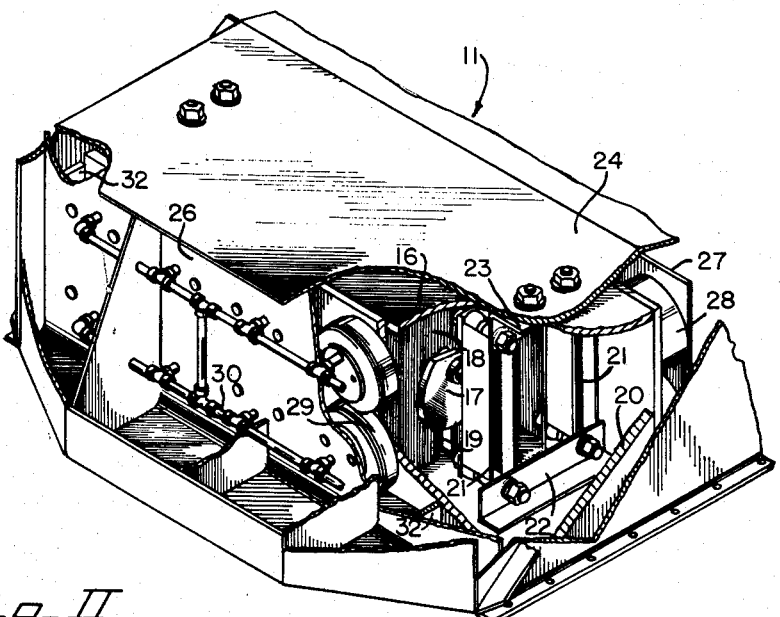
Fig. II
INVENTOR.
ALBERT MUSSCHOOT
BY
Marshall & Wilson
ATTORNEYS Dec. 18, 1962   A. MUSSCHOOT   3,068,996
REVERSIBLE VIBRATORY FEEDER
Filed June 27, 1961   2 Sheets-Sheet 2
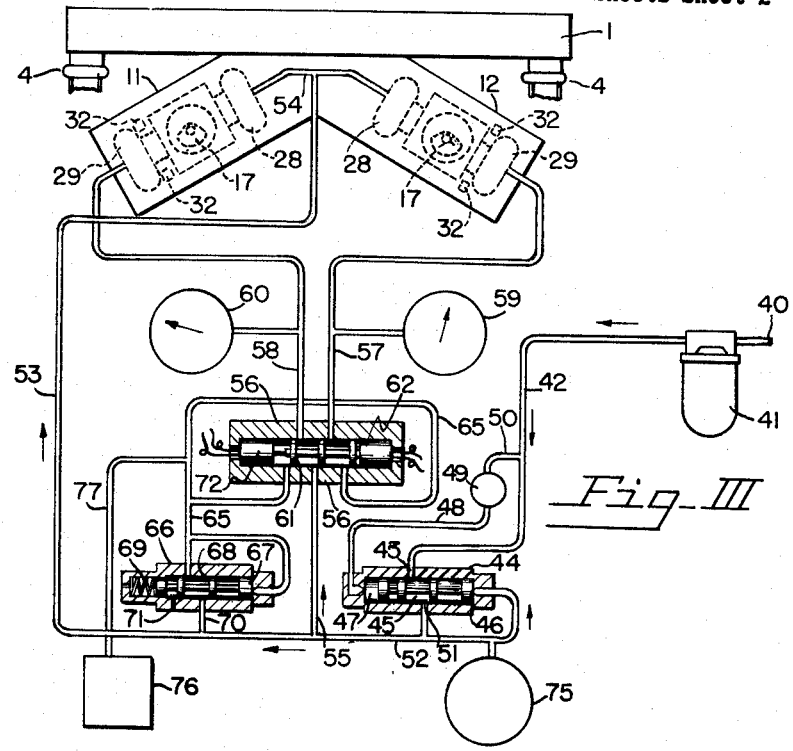
*Fig. III*
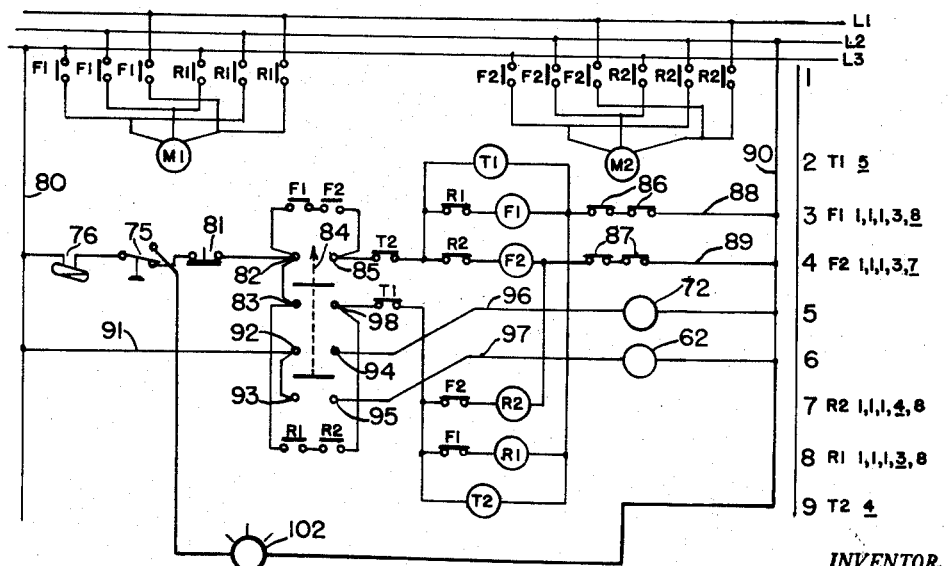
*Fig. IV*
INVENTOR.
ALBERT MUSSCHOOT
BY
Marshall & Wilson
ATTORNEYS United States Patent Office 3,068,996
Patented Dec. 18, 1962

3,068,996
REVERSIBLE VIBRATORY FEEDER
Albert Musschoot, Barrington, Ill., assignor to Chain Belt Company, Milwaukee, Wis., a corporation of Wisconsin
Filed June 27, 1961, Ser. No. 120,020
11 Claims. (Cl. 198—220)

This invention relates to vibratory conveyors and in particular to a vibratory conveyor that is adapted to convey material in either of two directions selectable at will by an operator.

In many processing systems it is desirable to selectively use portions of the apparatus and in order to do this effectively some switching arrangement must be included to direct the material to one portion of the apparatus or another. When the products being processed are handled on vibratory conveyors this selection is commonly accomplished by using trap doors in the bottom of the conveyor to discharge the conveyed material into any of a number of receiving conveyors. Often plant layouts do not lend themselves to this arrangement but rather require that the material be fed into the center portion of a conveyor and discharged at either one end or the other. When this type of physical layout of the apparatus is required it is then necessary that the conveyor itself be reversible so that it can be operated to convey the material either to the first end or be reversed to convey to the second end.

When vibratory conveyors are used for conveying and are operated in the conventional inclined throw arrangement, means must be provided to reverse the inclination of the vibratory path in order to change the direction of feed. In any commonly accepted design of vibratory feeder there is no ready means for reversing the inclination of the path other than completely disassembling the vibrator unit and reassembling it for operation in the opposite direction.

This is because the inclined links or cantilever springs used to guide the vibratory member must be rigidly attached to the base and to the vibratory member and cannot be satisfactorily adapted to operate in either of several readily selectable inclinations.

According to the invention a vibratory conveyor is mounted on universally resilient supports so that it may vibrate along any of a plurality of inclined paths and separate tuned vibration exciters are permanently connected to the vibratory member and are selectable by tuning to selectively vibrate the conveyor along inclined paths directed toward the opposite ends of the conveyor. Preferably the elastic or resilient members of the vibration exciters are composed of pneumatic springs that are tuned by variation of inflation pressures. Each of the exciters includes a motor driven eccentric weight which is kept in operation regardless of the direction of conveying then being employed.

A preferred embodiment of the invention is illustrated in the accompanying drawings.

In the drawings:

FIG. I is a perspective view with parts broken away showing the general arrangement of the conveyor, its supports, and the plurality of vibration exciters attached thereto.

FIG. II is a fragmentary perspective view with parts broken away showing one of the vibration exciters.

FIG. III is a diagrammatic view showing the vibratory conveyor, and the control systems for selectively tuning the individual vibration exciters to produce vibrations along a desired path.

FIG. IV is a schematic wiring diagram of the electrical portion of the control.

These specific figures and the accompanying description are intended merely to illustrate the invention and not to impose limitations on its scope.

In the apparatus as shown in FIG. I a conveyor trough 1 having rigid side walls 2 and a pair of transversely extending I beams 3 is resiliently supported on air springs 4 surmounting columns 5 erected from a foundation, not shown. The air springs 4, of which four are used in the arrangement shown, provide a soft resilient support for the conveyor 1 so that it may vibrate readily along any desired path. The air springs 4 are similar to the air springs used in trucks or heavy busses in lieu of conventional leaf or coil springs. As used in this structure the springs are inflated to a pressure just sufficient to carry the conveyor and its load.

Each of the air springs 4 preferably comprises an upper and lower disk like plate serving as a mounting plate for attachment to the adjacent portions of the structure and a flexible non-stretchable connecting wall connecting the plates and shaped like the outer portion of a torus.

In the arrangement shown the conveyor trough 1 is provided with covers 6 and 7 extending over the end portions of the conveyor. Material from a previous processing station is fed onto the conveyor through the space between the covers 6 and 7 and then is transported either to the right or to the left as seen in FIG. I along the conveyor and discharged through the end of the conveyor into the next processing station or onto the next conveyor leading to such processing station.

A structurally rigid housing 10 in the form of a shallow inverted V is attached to the lower portions of the conveyor 1 with its leg portions 11 and 12 extending downwardly away from the central portion of the conveyor at angles generally equal to the angle of attack of the vibratory motion to be imparted to the conveyor 1. The angle of attack is the inclination of the vibratory path of the conveyor with reference to a horizontal and in ordinary conveyors is of the order of 30 degrees. A pair of vibration exciters 13 and 14 are housed in the legs 11 and 12 of the housing 10.

Each of these vibration exciters, as may be seen in FIG. II comprises an exciter box 16 which houses a drive motor, not shown, having a double ended armature shaft each end of which carries an eccentric weight 17. The exciter box 16 including the motor housed therein has a mass which is the order of 20 to 25 percent of the mass of the conveyor trough 1 plus the inverted V shaped housing 11. It is preferred that each of the exciter boxes 16 be constructed of steel plate in the form of an open sided box having interior transverse partitions 18 to which the drive motor is attached. In order to permit assembly each of the interior partitions 18 has a slot 19 to accommodate the armature shaft of the motor. The exciter box 16 preferably extends lengthwise for substantially the full width of the housing leg 11 and has an end partition 20 closing the end of the box. The box 16 is guided for motion parallel to the path of vibration by sets of parallel links 21 the lower ends of which are attached to a bracket 22 bolted or welded to one wall of the exciter box 16 while the other ends of the links 21 are attached to a similar bracket 23 bolted to an upper wall 24 of the housing 11 and extending down through a clearance slot in the top of the exciter box 16. Preferably, rubber bushings are included in the joints between the links 21 and the brackets 22 and 23 to minimize wear at these points and provide a small amount of resiliency in the direction parallel to the length of the links to reduce the transmission of impact forces from the conveyor to the motor armature shaft bearings.

The exciter box 16 is resiliently positioned between transverse partitions 26 and 27 of the housing leg 11 by a plurality of air springs 28 located between the wall 27 and the adjacent exciter box 16 and similar air springs 29 located between the wall 26 and the adjacent side of the box 16. All of the air springs on one side of the box are connected together by piping 30 so that they may be inflated to a uniform pressure and thus avoid any localized strain on either the walls 26 or the wall of the exciter box 16.

Normally the exciter box 16 is held centrally located between the transverse walls 26 and 27 of the housing leg by maintaining substantially equal average pressures in the set of air springs 28 and 29. When these pressures are maintained approximately equal and adjusted to the proper pressure the air springs cooperate with the mass of the exciter box 16 as one mass and the conveyor as a second mass to form a two-mass resonant system that is driven to operating amplitudes of vibration by the eccentric weights 17.

As was mentioned in connection with FIG. I the conveyor is adapted to feed material in either of two directions, each direction being selected by causing one of the vibration exciters to be effective and the other to be non-effective. The selection of the vibration exciter to be non-effective or idle is accomplished by reducing the air pressure in the lower set of air springs such as the air springs 29 shown in FIG. II so that the inflated air springs on the other side of the exciter box drives the box 16 against stops 32 with sufficient force to prevent chattering. This prevents any resonant buildup of vibration in response to the forces of the eccentric weight 17 of the idle vibrator.

It is preferable that, regardless of the direction of conveying, the motors and eccentric weights of both vibrators be kept operating all of the time that the conveyor is in operation. If the armature shaft of the idle vibrator motor is fitted with ball bearings and is not kept in operation its armature shaft shakes in its bearings thus pitting or peening the bearings thus causing premature failure of the bearings. The active vibrator, the one that is tuned to resonance to amplify the vibratory forces from its eccentric weights determines the direction of vibration and produces the relatively longstroke of vibration.

At the same time the rotation of the eccentric weights of the idle vibrator produces vibratory force tending to drive the conveyor in a small circular orbital path of vibration which path is selected by the direction of rotation to aid the vibratory effect of the active, tuned vibrator. Thus the system is symmetrical with respect to conveying in either direction with the active vibrator providing most of the conveying force while the inactive or idle vibrator applies a small circular orbital vibration to aid the other. The resulting vibration of the conveyor structure is thus generally along a long narrow elliptical path the major axis of which is inclined with respect to the horizontal along the same line as the inclination of the leg of the housing of the casing of the active vibrator. This produces efficient conveying action.

A pneumatic control system for controlling the air pressure in the air springs 28 and 29 is illustrated in FIG. III. This control system is supplied with high pressure air from a shop supply line 40 through a filter 41 and pipe 42 that connects into a port 43 of a pressure regulating spool valve 44. The spool valve 44 includes a spool 45 that is urged in one direction or the other by the difference in pressures applied to chambers 46 and 47 at the ends of the spool. The chamber 47 is supplied with air at a regulated reference pressure through a pipe 48, reference pressure regulator 49 and pipe 50 connected into the supply pipe 42. The air at regulated reference pressure in the chamber 47 pushing against the end of the spool 45 drives the spool to the right as shown in FIG. III to uncover the port 43 and allow communication between that port and an outlet port 51 connected to a controlled pressure line 52. The line 52 is also connected into the chamber 46 to supply a counter-balancing pressure to the end of the spool 45. The spool is thus positioned by the difference between the pressures in the chambers 47, the regulating or reference pressure, and the outlet pressure in the pipe 52 as supplied to the chamber 46. If the outlet pressure is less than the reference pressure the spool valve moves to the right to admit more air to the outlet pipe 52 while if the outlet pressure exceeds the regulating pressure the spool moves to the left.

The air in the line 52 flows through pipe 53 that is connected through a T 54 to the piping feeding the upper air springs 28 of each of the vibration exciters. Thus the pressure in these air springs 28 is controlled according to the pressure setting of the regulator 49 which is reproduced through the spool valve 44 to provide substantial quantities of air as may be required by the air springs without allowing the pressure in the air springs to react back upon the pressure controlling regulator 49. The controlled pressure line 52 is also connected through a branch pipe 55 and a four way solenoid controlled valve 56 to either of a pair of pipes 57 or 58 connected to the lower air springs 29 of the exciters. The pipe 57 leads to the lower air springs 29 enclosed in the housing leg 12 while the pipe 58 goes to the air springs 29 in the housing leg 11. Pressure gauges 59 and 60 are provided to indicate the pressures applied to the air springs 29 in each of the exciters. When a spool 61 of the four way valve 56 is pulled to the right as shown, by solenoid 62, the air supply pipe 55 is connected to the outlet pipe 58 and air at controlled pressure is supplied to the lower air springs 29 in the left housing 11 so that the conveyor then operates to convey material to the right as shown in FIG. III. At the same time the lower air springs 29 in the exciter housing 12 are then connected through the pipe 57 and valve 56 to an outlet or low pressure pipe 65 connected to a low pressure regulator 66.

The low pressure regulator 66 is also a spool valve having a pressure chamber 67 at one end to drive the spool 68 toward the left and a spring 69 acting against the other end of the spool to resiliently resist the pressure supplied in the chamber 67. Thus the spool 68 takes a position in the spool valve 66 according to the difference between the pressure in the chamber 67 and the force exerted by the spring 69. When the spool 68 is in the position shown, air is admitted from the regulated pressure in the pipe 52 through a pipe 70 past the spool 68 and into the pipe 65. Pressure in this latter pipe also communicates through a branch pipe with the chamber 67 to apply a force forcing the spool 68 to the left against the spring 69. As the spool moves to the left its central flange blocks the entrance port from the pipe 70 while its left flange uncovers an outlet port 71 which then communicates through the valve with the pipe 65 to bleed air out of the system including the air springs 29 in the housing 12. This continues until the pressure in the pipe 65 drops to the low value and the spring 69 pushes the spool 68 far enough toward the right to block the discharge port 71. This occurs before the pipe 70 is uncovered so that the valve can maintain the low regulated pressure.

In a commercial embodiment of the invention the exciters were tuned substantially to resonance by the application of 63 pounds per square inch through the lines 48, 52 and the air springs 28 and 29 of the active vibrator. This provided the maximum amplitude of vibration for conveying. If it was desired to reduce the amplitude of vibration, to control the rate of feed, the air pressure could be raised to a higher value by adjustment of the regulator 49 to detune the vibration exciter and thus reduce the amplitude of vibration. At the same time in order to clamp the idle vibrator against its stops 32 the pressure in the pipe 65 was limited by the valve 66 to approximately 12 pounds per square inch. This provides a difference of 51 pounds per square inch in the air springs on opposite sides of the idle exciter to clamp it at one end of its stroke. The air pressure could be completely removed from the low pressure air springs thus increasing the clamping force except that it is necessary to maintain a small air pressure to keep the air springs in operative position. The pressure of 10 to 12 pounds per square inch is adequate for this purpose.

To reverse the direction of feed a solenoid 72 at the opposite end of the solenoid controlled valve 56 is energized to pull the spool 61 to the left thereby applying the controlled pressure from the pressure pipe 55 to the outlet pipe 57 and thus to the air spring 29 in the right exciter housing 12. The exciter in the housing 12 is then active to cause conveying to the left while the air springs 29 in the housing 11 are connected to the low pressure line 65 to cause clamping of that exciter.

To prevent improper operation of the equipment pressure switches are included which comprise a first pressure switch 75 that is connected directly to the controlled pressure pipe 53 and arranged to cut off electrical power to the controls for the electric drive motors in the exciter boxes unless the air pressure in the controlled pressure line is at least equal to the pressure at which the resonant systems are in tune for the maximum amplitude of vibration. Any decrease in pressure in small amounts below this limit results in tuning the exciters to resonance which is likely to cause excessive amplitude of vibration and damage to the equipment. Also to ensure that the idle vibrator is adequately clamped a low pressure air switch is connected through pipe 77 to the pipe 65 which in turn is connected through the four way solenoid valve 56 to the air spring of the idle vibrator.

A simplified diagram of the electrical controls for operating the four way solenoid valve and the drive motors for the exciter boxes is illustrated in FIG. IV. As may be inferred from FIGS. I, II and III two drive motors are employed for rotating the eccentric weights, one motor in each of the exciters in the housing legs 11 and 12. These motors are indicated as M1 and M2 in FIG. IV, M1 representing the motor in the exciter box in the housing 11 while M2 represents the motor in the exciter box in the housing leg 12. The motor M1 is connected to a three phase power line having leads L1, L2 and L3 through the contacts F1, and R1 of a pair of reversing motor starting contactors. Thus the motor M1 is energized for rotation in a forward direction when contacts F1 are closed and is connected for rotation in the reverse direction when contacts R1 are closed. Likewise motor M2, for the other exciter, is connected to the three phase power line through contacts of a forward motor starter F2 for forward rotation and for reverse rotation through contacts R2 of a reverse starter R2.

The electrical control circuits are shown in lines 3 to 9 inclusive on FIG. IV. Each of the lines is numbered on the right hand margin and, for identification, each of the relay coils shown in such line is indicated by its symbol at the right and, following the symbol, are listed the line numbers of the lines in the diagram at which the contacts operated by that relay coil are located. An underscored line number indicates that the contacts represented thereby are normally closed.

In this particular circuit, power taken from the three phase power line L3 through a lead 80 flows through the pressure switches 76 and 75 thence through contacts of a stop button 81 to energize contacts 82 and 83 of a spring-return selector switch 84. The momentary operation of this selector switch determines the direction of conveying when the switch is thrown to the left, contact 82 is connected to contact 85 so that current may then flow through normally closed reverse timer contacts T2, normally closed R1 and R2 contacts in lines 3 and 4, and thence through motor starter relay coils F1 and F2 in lines 3 and 4 respectively. The starter coils F1 and F2 are connected through overload contacts 86 for the motor M1 and contacts 87 for the motor M2 and leads 88 and 89 to a return lead 90. Once the starter relays F1 and F2 have picked up in response to current flow through the coils a bypass circuit through contacts F1 and F2 in line 3 is completed in parallel with the circuit from contact 82 and contact 85 of the selector switch so that the selector switch may now be released and returned to the center leaving the motors in operation.

At the same time that the motor starters F1 and F2 are energized a circuit is also completed from the lead 80 through a lead 91, line 6, to contacts 92 and 93 of the selector switch. The cooperating contacts 94 and 95 are connected through leads 96 and 97 to the solenoids 62 and 72. Thus when the selector switch 84 is thrown to the left its contacts 92 and 94 are connected together to energize the solenoid 72 and thus, see FIG. III, draw the solenoid valve spool 61 to the left so that full air pressure is then applied to both air springs of the exciter in the housing 12 thus causing vibration in a direction to convey materials to the left.

To prevent reversal of the exciter motors before the air pressure has stabilized in the springs, timers T1 and T2 are provided. These timers are connected in parallel with the motor starter coils F1 and R1 respectively and are arranged to hold their contacts T1 and T2 open as long as they are energized and for approximately a minute thereafter. Several dashpot controlled relays are suitable for this purpose. Thus as long as F1 is energized for forward conveying T1 is energized and its contacts T1 in line 5 are open so that R1 and R2 cannot be energized. This condition holds for the time delay after operation of the stop button 81 thus preventing reversal without providing time for the motors to stop.

It may also be desirable as a further protective feature to replace the pressure gauges 59 and 60 with pressure switches and substitute the contacts of such switches for the timer contacts T2 and T1 in lines 4 and 5. These, if used, are arranged so that motor starters F1 and F2 cannot be energized unless full pressure exists in tube 57. Likewise reverse starters R1 and R2 cannot be energized unless full pressure exists in tube 58.

In the event it is desired to convey material to the right the selector switch 84 is turned to right hand position in which its contacts 93 and 95 are connected to energize the solenoid 62. At the same time contacts 83 are connected to contacts 98 to energize through normally closed timer contacts T1 and normally closed forward starter contacts F1 and F2 the coils R1 and R2 of the reverse direction motor starters R and R2.

Signal lights connected in parallel with the starter relay coils may be provided for indicating the direction of rotation of the motors M1 and M2. A signal light 102, serving as a warning signal that insufficient air pressure has been applied to operate the air switch 75, may be connected between the switch 75 and the return lead 90.

As has been mentioned previously it is desirable to keep both motors in operation at all times that the conveyor is in operation to avoid damage to the motor shaft bearings which occurs if a motor is not running while its frame is being vibrated. As long as the armature shafts of the motors carry eccentric weights and the motors are operating at their normal speed of rotation the centrifugal forces exerted by the eccentric weights hold the armature shafts in firm contact in their bearings, as the shafts rotate, with a force that exceeds the acceleration forces tending to shake the shafts in the bearings as the frames vibrate. Thus a generally uniform loading is maintained on the bearings and impact or hammering forces are avoided.

The motors are reversed in their direction of rotation when the direction of feeding is reversed because the idle motor and exciter should turn in such a direction that the orbital motion induced by the eccentric weights of the clamped exciter box tend to cause conveying motion of the conveyor in the desired direction. If the motors were not reversed this orbital motion produced by the idle vibrator opposes the conveying action and thus interferes with the best operation of the unit.

This combination of two tuned vibratory exciters acting in generally opposite directions on a single conveyor makes it possible, by variation in the tuning, to quickly and easily select the desired direction of conveying and by regulation of the inflation pressure of the air springs regulate the rate of conveying.

Various modifications of the illustrated structure may be made without departing from the spirit and scope of the invention.

Having described the invention, I claim:

1. In a conveyor type feeder, in combination, an elongated work member to be selectively vibrated along predetermined paths, resilient means supporting said member for vibration along any of a plurality of paths of vibration, a first exciter system comprising an exciter mass and an adjustable rate spring coupling the mass to the member for vibrating the member along a first path inclined from the horizontal toward one end of the member, a second exciter system comprising a second exciter mass and a second adjustable spring coupling the second mass to the member for vibrating the member along a second path inclined from the horizontal toward the other end of the member, eccentric weights journaled in said exciter masses, means for rotating said weights at a generally constant frequency, and means for selectively adjusting said adjustable rate springs to tune one of said exciter systems approximately to resonance at said generally constant frequency while immobilizing the other of said systems, whereby said member is selectively vibrated along either of said inclined paths.

2. In a conveyor type feeder, in combination, an elongated work member to be selectively vibrated along predetermined paths, resilient means supporting said member for vibration along any of a plurality of substantially linear paths of vibration, a first exciter system comprising an exciter mass and an adjustable rate spring coupled to the member for vibrating said member along a first substantially linear path, a second exciter system comprising a second exciter mass and a second adjustable rate spring coupled to the member for vibrating said member along a second substantially linear path, an eccentric weight journaled in each exciter mass, means for rotating the weights at a predetermined frequency, and means for selectively adjusting said springs to tune one exciter system substantially to resonance at said frequency while immobilizing the other exciter system.

3. In a conveyor type feeder, in combination, an elongated work member to be selectively vibrated along predetermined paths, resilient means supporting said member for vibration along any of a plurality of substantially linear paths of vibration, a first exciter system comprising an exciter mass and a plurality of air springs coupling the exciter mass to the member for vibration along a first substantially linear path that is inclined toward one end of the member, a second exciter system comprising an exciter mass and a plurality of air springs coupling the exciter mass to the member for vibration along a second substantially linear path that is inclined toward the other end of the member, an eccentric weight journaled in each of said exciter masses, means for rotating the weights at a predetermined speed, and means for selectively varying the air pressure in the air springs to selectively lock one exciter system and tune the other of said exciter systems substantially to resonance at said predetermined speed to vibrate said member along the path of the tuned exciter system.

4. In a conveyor type feeder, in combination, a conveyor trough adapted to receive material intermediate its ends, resilient means supporting said trough for vibration along any of a plurality of substantially linear paths of vibration, a pair of vibration exciters each comprising an exciter mass and an air spring connecting the exciter mass to the conveyor trough, an eccentric weight journaled in each exciter mass, means for rotating said weights, one of said exciters being directed for vibration along a path inclined toward one end of said trough and the other being directed along a path inclined toward the other end of the trough, and means for selectively varying the air pressure in the air springs lock one of said exciters and to tune the other of said exciters substantially to resonance, whereby material is conveyed in the direction determined by the tuned exciter.

5. In a conveyor type feeder, in combination, a conveyor trough adapted to receive material intermediate its ends, resilient means supporting said trough for vibration along any of a plurality of substantially linear paths of vibration, a pair of vibration exciters each comprising a mass and opposed pairs of air springs connecting the mass to the conveyor trough, an eccentric weight journaled in each mass, means for rotating said weights, one of said exciters being directed for vibration along an inclined path toward one end of the conveyor and the other being directed for vibration along an inclined path toward the other end of the conveyor, means for selectively regulating the air pressure in the air springs for tuning a selected one of the exciters to resonance, and means providing a pressure difference in the opposed air springs of the non-selected exciter for clamping that exciter at one end of its stroke.

6. In a bidirectional vibratory conveyor, in combination, a conveyor trough adapted to receive material intermediate its ends, resilient means for supporting the trough for vibration along either of a pair of paths one inclined toward each end of the trough, a vibration exciter for driving the trough along each of said paths, each exciter comprising a mass and a pair of opposed air springs coupling the mass to the trough, eccentric weights journaled in the exciter masses, means for driving the eccentric weights, and pressure regulating means for controlling the air pressure in the air springs, said means providing air at regulated pressure to all air springs of a selected exciter and to certain air springs of the other exciter, and means supplying a different pressure to the remaining air springs of said other exciter, whereby the selected exciter is tuned to resonance and the other exciter is locked at one end of its stroke.

7. A conveyor control according to claim 6 in which the air pressure in said remaining air springs is substantially lower than said regulated pressure.

8. In a bidirectional conveyor, in combination, a conveyor trough adapted to receive material intermediate its ends, resilient means supporting the trough for vibration along either of a pair of paths one inclined toward each end of the trough, a pair of vibration exciters one for driving the trough along each of said paths, each of said exciters comprising a mass and opposed air springs connecting the mass to the trough, an eccentric weight journaled in each mass, means for rotating the eccentric weights in like directions, means for maintaining a selected air pressure in certain of said air springs for tuning the associated exciter substantially to resonance at the operating speed of the eccentrics, and means for maintaining a different selected pressure in certain others of said air springs to clamp the associated exciter at an end of its stroke whereby said exciters are selectively operable to produce conveying vibration of the trough.

9. In a bidirectional conveyor, in combination, a conveyor trough adapted to receive material intermediate its ends, resilient means supporting the trough for vibration along either of a pair of paths one inclined toward each end of the trough, a pair of vibration exciters one for driving the trough along each of said paths of vibration, each of said exciters comprising a mass and coupling springs connecting the mass to the trough, an eccentric weight journaled in each exciter mass, an adjustable spring included in the coupling spring of each exciter for tuning the exciter to resonance, motor means for driving the eccentric weights, means for controlling the adjustable springs to selectively lock one exciter and tune the other exciter to resonance and means for varying the direction of rotation of the eccentric weights in accordance with the exciter tuned to resonance.

10. In a conveyor type feeder, in combination, an elongated work member to be selectively vibrated along predetermined paths, resilient means supporting said member for vibration along any of a plurality of paths of vibration, a first exciter system comprising an exciter mass and an adjustable rate spring coupling the mass to the member for vibrating the member along a first path inclined from the horizontal toward one end of the member, a second exciter system comprising a second exciter mass and a second adjustable spring coupling the second mass to the member for vibrating the member along a second path inclined from the horizontal toward the other end of the member, eccentric weights journaled in said exciter masses, means for rotating said weights at a generally constant frequency, and means for selectively adjusting said adjustable rate springs to selectively tune said exciter systems approximately to resonance at said generally constant frequency, whereby said member is selectively vibrated along either of said inclined paths.

11. In a conveyor type feeder, in combination, an elongated work member to be selectively vibrated along predetermined paths, resilient means supporting said member for vibration along any of a plurality of substantially linear paths of vibration, a first exciter system comprising an exciter mass and an adjustable rate spring coupled to the member for vibrating said member along a first substantially linear path, a second exciter system comprising a second exciter mass and a second adjustable rate spring coupled to the member for vibrating said member along a second substantially linear path, an eccentric weight journaled in each exciter mass, means for rotating the weights at a predetermined frequency, and means for selectively adjusting said springs to selectively tune said exciter systems substantially to resonance at said frequency.

References Cited in the file of this patent
UNITED STATES PATENTS 2,984,339      Musschoot _____ May 16, 1961